United States Patent [19]

Endo

[11] Patent Number: 5,781,705
[45] Date of Patent: Jul. 14, 1998

[54] METHOD AND APPARATUS FOR CONTROLLING THE MOTION OF A REDUNDANCY MANIPULATOR

[75] Inventor: Noriko Endo, Hyogo-ken, Japan

[73] Assignee: Mitsubishi Jukogyo Kabushiki Kaisha, Japan

[21] Appl. No.: 723,470

[22] Filed: Oct. 9, 1996

[30] Foreign Application Priority Data

Oct. 11, 1995 [JP] Japan ................................ 7-263054

[51] Int. Cl.$^6$ ............................ G05B 13/00; G05B 13/02
[52] U.S. Cl. ............................ 395/97; 395/80; 395/87; 318/568.22
[58] Field of Search ............................ 395/97, 80, 87; 318/568.22

[56] References Cited

U.S. PATENT DOCUMENTS

| | | | |
|---|---|---|---|
| 4,606,695 | 8/1986 | Lenz | 414/735 |
| 4,828,453 | 5/1989 | Martin et al. | 414/738 |
| 4,937,759 | 6/1990 | Vold | 901/15 |
| 5,430,643 | 7/1995 | Seraji | 364/167.01 |
| 5,581,166 | 12/1996 | Eismann et al. | 318/568.22 |

OTHER PUBLICATIONS

"Advanced Ultrasonic Testing Machine for Reactor Vessel" published by Mitsubishi Heavy Industries, Ltd. of Tokyo, Japan, Dec. 1995.

Seraji et al., "Motion Control of 7-DOF Arms: The Configuration Control Approach", IEEE Transactions on Robotics and Automation, vol. 9, No. 2, Apr. 1993.

Chan e al., "Generation of Joint Trajectory Requiring Lower Joint Velocities for a Redundant Manipulator", IEEE Inter. Conf. on Advanced Robotics, 1992.

Dubey et al, "Real-Tme Implementation of an Optimization Scheme for Seven-Degree-of-Freedom Redundant Manipulators", IEEE Transactions on Robotics and Automation, vol. 7, No. 5, Oct. 1991.

*Primary Examiner*—George B. Davis
*Attorney, Agent, or Firm*—Michael N. Meller

[57] ABSTRACT

A method and apparatus for controlling the motion of a redundancy manipulator in which the redundancy manipulator has at least seven axes. The optimal estimate function is calculated for the target posture among an infinite number of (possible) elbow postures of the redundancy manipulator to ensure that the elbow reaches its target position at least before the hand position or posture values reaches its targeted value. The elbow posture of said redundancy manipulator is controlled based on the estimate function K.

11 Claims, 3 Drawing Sheets

METHOD AND APPARATUS FOR CONTROLLING THE MOTION OF A REDUNDANCY MANIPULATOR

TECHNICAL FIELD

This invention relates to a method and apparatus for controlling a redundancy manipulator.

BACKGROUND OF THE INVENTION

Among many manipulators used for industrial robots, a manipulator having a maximum of six (6) axes of motion is popular. This is because six (6) axes are generally sufficient for positioning an object. On the other hand, a person's arm corresponds to a seven-axis manipulator. Even if the hand's location and direction are fixed at a value, the person can still move his/her elbows. Such redundancy that exists in an arm enables a person to position an object and yet avoid an obstacle at the same time by using his/her elbow. For this advantage, in recent years, the redundancy manipulator having seven (7) axes has been developed in an attempt to provide the same redundancy as an arm.

Compared to a six-axis manipulator, a seven-axis manipulator has redundancy that enables higher degrees of freedom in controlling motions. That is, in a six-axis manipulator, once the hand position or posture is determined, each axial value is automatically determined, ensuring the hand position or posture and the posture of the manipulator that have been taught.

On the other hand, in a seven-axis manipulator, there are an infinite number of combinations of each axial value that can fulfill the hand position or posture. Therefore, determining only the hand position or posture does not determine an arm posture. For example, in the case of a person's arm, which is like a seven-axis manipulator, the trace provides redundancy. With this redundancy, the seven-axis manipulator is advantageous since it can carry out a variety of different tasks such as detouring to avoid an obstacle. To achieve this advantage, it is necessary for a manipulator to control the posture (each axial value) as taught.

In the conventional motion-controlling method and apparatus for a redundancy manipulator, two points are taught for the hand position or posture value and each axial value. When one tries to move from Point 1 to Point 2, the vector with which all seven axes approach the target axial values is calculated and the redundancy axis is controlled based on such vector. However, with this conventional motion-controlling method, all the axes gradually approach the target axial values. Therefore, the binding force for the redundancy axis is weak. At times, the redundancy axis does not move as it should depending on which motion the redundancy manipulator is trying to accomplish. That is, there is a problem that the target posture and redundancy axis of a manipulator differ from those that are targeted. This is due to the fact that, with conventional systems, the hand position or posture value of a redundancy manipulator does not reach its targeted value at the same time that each axial value reaches its targeted value.

In addition, when one tries to take advantage of the ability to avoid an obstacle or specific point, calculating the optimal vector to control each axis takes an extremely long time, making it difficult to control on a real-time basis.

Every manipulator has an end effector which is to be moved from its present position to a target position. The manipulator incorporating the principles of the present invention describes the end effector as the hand position or posture in the illustrated embodiment.

As described, in the conventional method and apparatus of controlling a redundancy manipulator, the binding force of the redundancy axis is weak. When the hand position or posture of the manipulator reaches its targeted value, each axial value may not as yet have arrived at its targeted value. Consequently, a problem is encountered that the target posture and redundancy axis of a manipulator differ from those that are targeted. In addition, the calculation needed to control each axis takes an extremely long time, making it difficult to control on a real-time basis.

The method and apparatus incorporating the principles of the present invention overcomes the above problems and provides a motion-controlling method and apparatus for a redundancy manipulator in which the hand position or posture and each axial value of the manipulator are controlled as taught.

SUMMARY OF THE INVENTION

The apparatus incorporating the principles of the present invention provides apparatus for controlling the movement of an end effector of a redundant manipulator from a present position to a target position. The manipulator has at least seven axes of motion and includes a key redundancy axis and a first detector for detecting the values for the present positions of the end effector and of each of the axes of the manipulator. This detector provides first output signals corresponding to the respective present positions. A second detector is provided for detecting the values for the target positions for the end effector and for each of the axes of the manipulator. The second detector provides second output signals corresponding to the target positions.

A first computer is included which is responsive to the first and second output signals for providing a third output signal in the form of a seven-dimensional vector corresponding to the target positions for each of the seven axes. Also included is an end effector controller which is responsive to the first and second output signals for providing a fourth output signal corresponding to the end effector velocity for each axis as the end effector is moved to its target position.

A key redundancy axis controller is provided which is responsive to the first and second output signals and provides a fifth output signal corresponding to the angular velocity of the key redundancy axis as the end effector is moved to its target position. A second computer is included responsive to the third, fourth, and fifth output signals for providing a sixth output signal corresponding to the axial velocity of each of the axes as the end effector is moved to its target position.

Finally, a third computer is arranged in the apparatus responsive to the sixth output signal for calculating an angular velocity for each axis other than the key redundancy axis. The third computer provides a seventh output signal corresponding to the angular velocity for each of the axes other than the key redundancy axis and to the axial velocity of the key redundancy axis for moving the end effector to the target position. Accordingly, the end effector and each of the axes reaches its respective target position substantially simultaneously.

In one embodiment, the manipulator is a shoulder, arm, and hand manipulator, the key redundancy axis corresponds to the elbow, and the end effector corresponds to the hand.

An embodiment of the present invention provides a respective motor for rotating each of the axes. The first computer is a first estimate value, $\xi(\theta)$, computer, and a seven-dimensional vector has seven (7) elements showing seven (7) ratios for the rotational direction of each of the motors.

A method incorporating the principles of the present invention includes controlling the movement of an end effector of a redundancy manipulator from a present position to a target position. The manipulator has an elbow posture and at least seven axes of motion. The method further includes calculating the optimal estimate function for the elbow target posture from among an infinite number of possible elbow postures of the manipulator to permit the elbow posture to reach the elbow target posture at least before the end effector reaches the target position. The method also includes controlling the elbow posture of the redundancy manipulator based on the optimal estimate function.

The elbow of the manipulator corresponds to a person's elbow joints and is defined by linkages in the redundancy manipulator constructed with a plurality of axes and its posture is determined by each axial angle. In addition, a estimate function, herein, is defined as the value representing a displaced distance with respect to the axial value at which each axial shift is minimized during maneuvering, where the estimate function takes arbitrary values.

In the motion-controlling method with this configuration, the estimate function is determined such that an elbow posture, that is, each axial value reaches its targeted value at least before the hand position or posture value reaches its target. With this motion-controlling method, the redundancy manipulator controls each axial motion so they reach their target angles naturally while maintaining the elbow posture. When the hand position or posture reaches its targeted value, the elbow posture, that is, each axial angle approaches its targeted value simultaneously. In this way, the hand position and the elbow are ensured at the same time.

In the method of motion controlling for a redundancy manipulator, the redundancy manipulator having at least seven axes including a key redundant axis determined by the links configured for the manipulator, an axial angle velocity is calculated for the key redundant axis, before a hand position or posture reaches its targeted value in every sampling cycle. The key redundancy axial value is interpolated so that it reaches its targeted value in every sampling cycle. Consequently, computing the axial angle velocity for axes other than the key redundant axis in every sampling cycle based on the axial angle velocity of the key redundant axis is carried out.

In the motion-controlling method for the redundancy manipulator of this configuration, the key redundant axis is strongly bound to and always moves to the targeted value in every sampling cycle while other axes move according to each angular velocity as actualized. As a result, the binding force of the redundancy axis becomes strong enough to control the redundancy manipulator as taught in advance.

In the method of motion controlling for a redundancy manipulator, the redundancy manipulator having at least seven axes detects the present value and the targeted value for each axis in every sampling cycle. The present value and the targeted value comprise the hand position or posture and each axial value. Then the redundancy manipulator calculates a estimate function based on the axial velocity for the hand position or posture velocity and the key redundant axis velocity obtained by interpolating the key redundant axial value so that it reaches its target axial value in every sampling cycle. The axial angle velocities for axes other than the key redundant axis are calculated based on a estimate function in every sampling cycle.

At this time, the axial angle velocity can be calculated based on the axial angle deviation of said key redundant axis.

In this motion-controlling method of a redundancy manipulator, the optimal hand position or posture velocity and an angular velocity for each axis is calculated in every sampling cycle based on the present value and the targeted value, providing a highly efficient control.

BRIEF DESCRIPTION OF THE DRAWINGS

The above and other objects, features, and advantages of the present invention will become more apparent from the following detailed description taken with the accompanying drawings, in which.

DESCRIPTION OF THE PREFERRED EMBODIMENT

Figure 1:
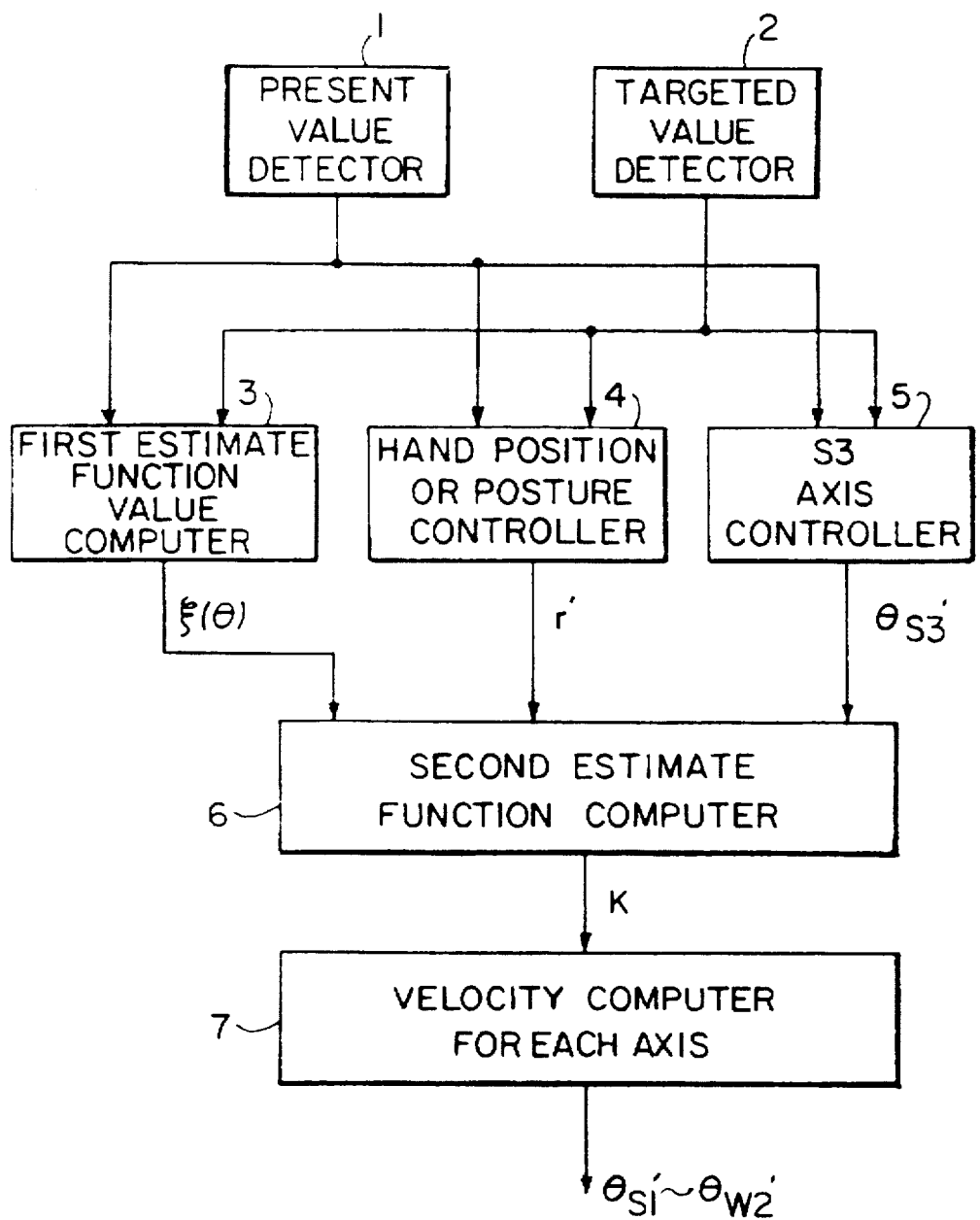
FIG. 1 is a block diagram of the control circuit for a manipulator according to a first embodiment of the present invention.
Figure 2:
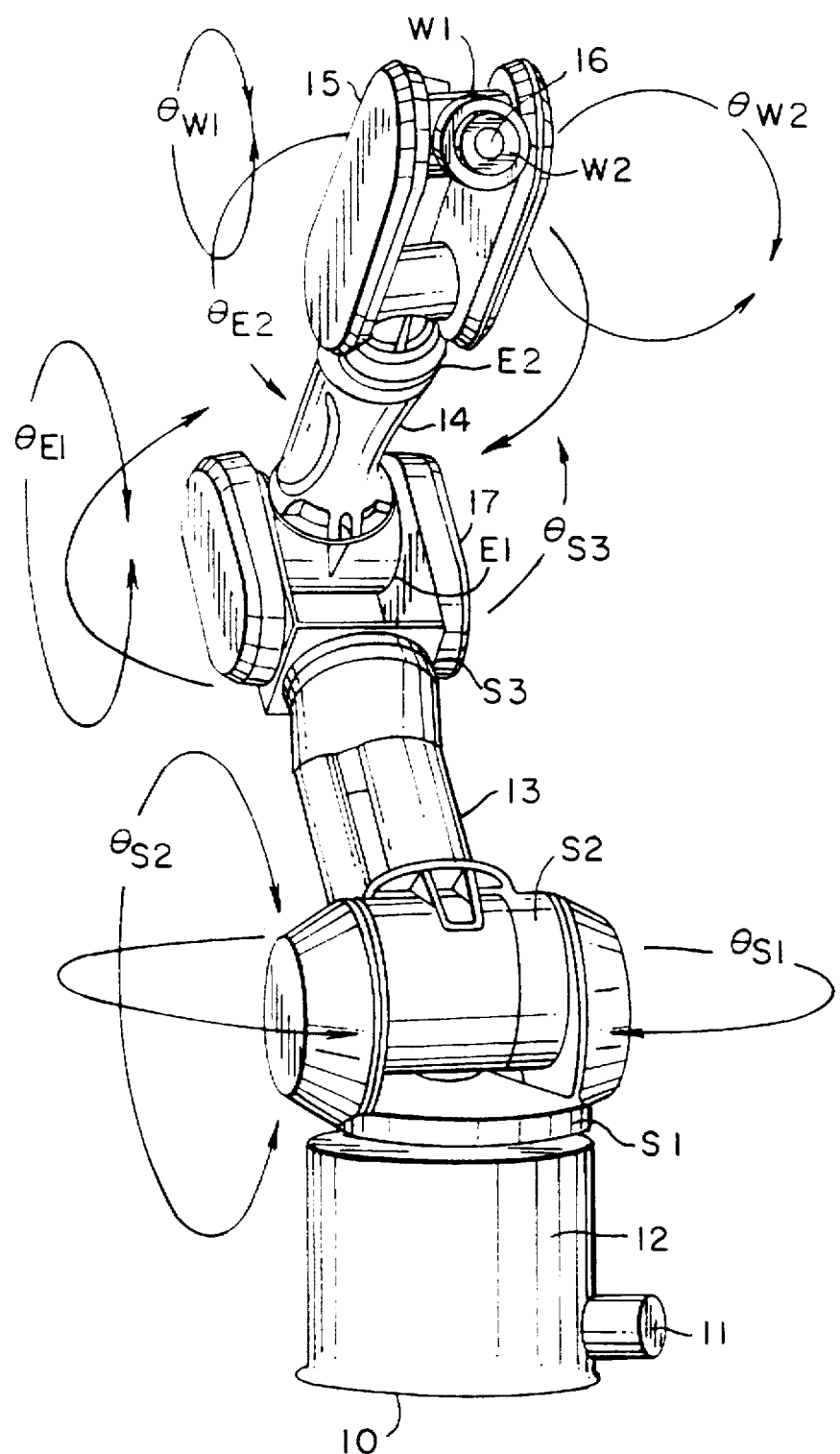
FIG. 2 is a three-dimensional view of the structure of a manipulator in accordance with the first embodiment of the present invention.

Referring to the drawings and more particularly to FIGS. 1 and 2, FIG. 1 is a block diagram illustrating the configuration of the control circuit for the redundancy manipulator associated with the first embodiment of this invention. This control circuit for a redundancy manipulator comprises a present value detector 1, a targeted value detector 2, a first estimate function value computer 3, a hand position or posture (end effector) controller 4, an S3 axis controller 5, a second estimate function computer 6, and a velocity computer for each axis 7.

FIG. 2 illustrates the structure of the seven-axis manipulator which is employed in this first embodiment. The seven-axis manipulator comprises a shoulder 12 having a connector 11 supported by a base surface 10, an upper arm 13, a lower arm 14, a wrist 15, and an end effector, mechanical interface 16 formed on top of the wrist 15. Between the shoulder 12 and the upper arm 13, two rotational axes S1 and S2 are provided. The S1 axis rotates the arm 13 through an angle $\theta_{S1}$. The S2 axis rotates the arm 13 up and down through an angle $\theta_{S2}$. Between the upper arm 13 and the lower arm 14, two axes S3 and E1 are provided. The S3 axis rotates the arm 14 through an angle $\theta_{S3}$. The E1 axis turns the arm 14 up and down through an angle $\theta_{E1}$.

The S3 axis is the key redundancy axis in this embodiment wherein the key redundancy axis is defined by the linkage configuration of the manipulator. Note that this embodiment is applicable to those redundancy manipulators having other linkage configurations if they have a definite key redundant axis and control the manipulator with respect to this axis in the described manner. In addition, in FIG. 2, an elbow 17 is illustrated and is generally referred to as the elbow of a manipulator.

Furthermore, between the lower arm 14 and a wrist 15, an E2 axis is formed. The E2 axis rotates the arm 14 through an angle $\theta_{E2}$. Between the wrist 15 and a mechanical interface 16, a W1 axis and a W2 axis are formed. The W1 axis may wave a hand through an angle $\theta_{W1}$. The W2 axis may rotate a hand through an angle $\theta_{W2}$. Note that the rotational directions of axes S1 to W2 (S1, S2, S3, E1, E2, W1, W2) are indicated as $\theta_{S1}$ to $\theta_{W2}$ ($\theta_{S1}$, $\theta_{S2}$, $\theta_{S3}$, $\theta_{E1}$, $\theta_{E2}$, $\theta_{W1}$, $\theta_{W2}$. The operation of this embodiment is described hereafter.

It should be appreciated that a plurality of motors are provided, at least one for each axis. Electrical connections for these motors are provided via the connector 11. However, the motors are only schematically illustrated since they are conventional and in order to avoid unduly complicating the drawing.

When the hand (end effector) of the redundancy manipulator is to be moved from one point to another (present position to target position), the teaching data is provided to the redundancy manipulator. This data includes a hand position or posture value and the value of each axis (each axial angle) regarding the initial point of the hand and the final destination. The hand position or posture value here is defined as a three-dimensional position for the hand on the manipulator which comprises six (6) elements to express the hand posture at that position. The hand position or posture is represented by the following formula: r=(x, y, z, yaw, pitch, roll).

First of all, the present value detector 1 (see FIG. 1) detects the present values indicating the hand position or posture value and each axial value of the redundancy manipulator at a point. This can be determined from the present joint or elbow angle for the seven axes based on the value obtained at the "resolver" installed in the joint or elbow motor. The detector 1 outputs this data to the computer 3 for the first estimate function, the controller 4 for the hand position or posture, and the controller 5 for the S3 axis. A targeted value detector 2 detects the targeted values in every sampling cycle, for the hand position or posture value and each axial value for each sampling cycle and applies this data to the computer 3 for the first estimate function, to the controller 4 for the hand position or posture, and to the controller 5 for the S3 axis.

Deviations for the hand position or posture and the S3 axial angle are obtained based on the orbital start point and the orbital end point.

The cycle time or number of cycles required for reaching the target is calculated by dividing each of the deviations by its default velocity. The largest number of cycles among the three calculated values is used as the standard value.

Again, by dividing each of the deviations by the standard number of cycles, the velocity for the hand position or posture per cycle and the value by which the S3 axial angle has moved are obtained. The target value in each of the cycles is obtained using the following formula:

Displaced distance×time=Target value per cycle

In order to move a seven-axis manipulator along a pre-determined orbit, the hand or posture velocity comprising six elements is computed as follows: r'=(x', y', z', yaw', pitch', roll'). Then the angular velocity for each axis comprising seven elements is computed as follows: $\theta'=(\theta_{S1}', \theta_{S2}', \theta_{S3}', \theta_{E1}', \theta_{E2}', \theta_{W1}', \theta_{W2}')$, using the angular velocity $\theta'$ for each axis as a taught value for motors of each axis in the sampling cycle. The relation between the hand position or posture velocity r' and the angular velocity $\theta'$ for each axis is described as follows using a Jacobian matrix: r'=J $\theta'$. In addition, the angular velocity $\theta'$ for each axis is obtained from the hand position or posture velocity r' by solving the following formula:

$$\theta' = J^* \cdot r' + (I - J^* \cdot J) \cdot \xi(\theta) \cdot K \quad (1)$$

where J is the 6×7 Jacobian matrix, J* is the 7×6 quasi-Jacobian matrix, I is 7×7 unit matrix, $\xi(\theta)$ is the 7×1 vector and K is an arbitrary scalar value.

In formula (1), J*·r', the first term on the right-hand side is called a "special solution," which is the least value (hereafter referred to as the least norm) with which a manipulator is moved to the targeted hand position or posture. This value is determined by r' which is the hand position or posture velocity. In addition, (I−J*·J)·$\xi(\theta)$·K, the second term on the right-hand side, is called a "common order term" which is the value which controls the remaining redundant motion. With this "common order term," the posture changes without changing the hand position or posture of the manipulator. I−J*·J in the "common order term" represents 0 space in the Jacobian matrix, therefore, its value is determined; $\xi(\theta)$·K is the portion called a estimate function and it can be given any arbitrary value.

That is, to control the motion of a redundancy manipulator, the estimate function $\xi(0)$·K must be optimized. Note that $\xi(0)$ is the amount of vector, K is the amount of scalar while $\xi(\theta)$ is the first estimate function, and K is the second estimate function.

Figure 3:
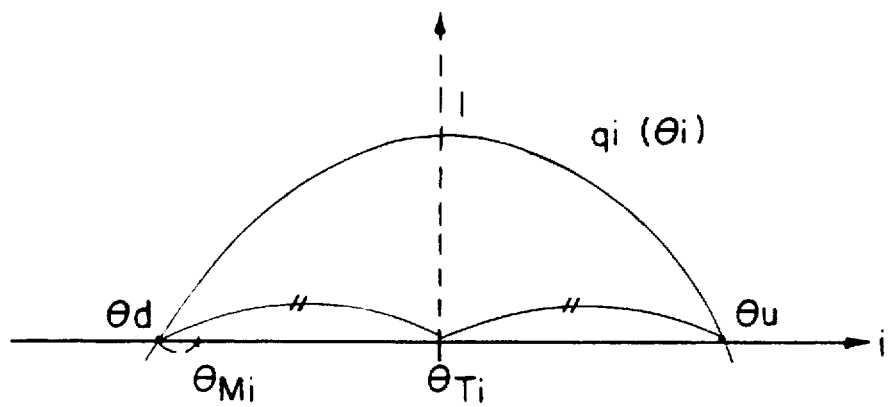
FIG. 3 is a graph used for calculating target values in accordance with the principles of the present invention.

The computer 3 for the first estimate function computes the first estimate function $\xi(\theta)$ based on the present value output of the present value detector 1 and the targeted value output from the targeted value detector 2. In this embodiment, the same vector used in a conventional redundancy manipulator is used for the first estimate function $\xi(\theta)$. The method of calculating the first estimate function $\xi(\theta)$ is described referring to FIG. 3 herein. Note that FIG. 3 illustrates a quadratic curve:

$$q_i(\theta_i)(i=\{S1, S2, S3, E1, E2, W1, W2\}).$$

The first estimate function $\xi(\theta)$ is a seven-dimensional vector having seven (7) elements showing seven (7) ratios for the rotational direction (+, −) of a motor for each axis and its size. For each axis, a convex quadratic curve $q_i(\theta_i)$ having a height I is drawn as shown in FIG. 3. Assume present values for each axis to be $\theta_{Mi}=\{\theta_{MS1}, \ldots, \theta_{MW2}\}$ and targeted values for each axis to be $\theta_{Ti}=\{\theta_{TS1}, \ldots, \theta_{TW2}\}$. Also assume the lower limit angle to be $\theta_d$ and the upper limit angle to be $\theta_u$, the quadratic curve $q_i(\theta_i)$ is represented by the mathematical equation as follows:

Mathematical Equation 1

$$q_i(\theta_i) = -\left(\frac{2}{\theta_d - \theta_u}\right)^2 (\theta_i - \theta_d)(\theta_i - \theta_u)$$

where the first estimate function $\xi(\theta)=\{\xi_{S1}, \xi_{S2}, \ldots, \xi_{W2}\}$ can be obtained by calculating the following mathematical equation:

Mathematical Equation 2

$$\xi_{S1} = \frac{\partial q_{S1}(\theta_{MS1})}{\theta_{S1}} \cdot q_{S2}(\theta_{MS2}) \cdot q_{S3}(\theta_{MS3}) \cdot \ldots \cdot q_{W2}(\theta_{MW2})$$

$$\xi_{S2} = q_{S1}(\theta_{MS1}) \cdot \frac{\partial q_{S2}(\theta_{MS2})}{\theta_{S2}} \cdot q_{S3}(\theta_{MS3}) \cdot \ldots \cdot q_{W2}(\theta_{MW2})$$

$$\vdots$$

$$\xi_{W2} = q_{S1}(\theta_{MS1}) q_{S2}(\theta_{MS2}) \cdot \ldots \cdot q_{W1}(\theta_{MW1}) \cdot \frac{\partial q_{W2}(\theta_{MW2})}{\theta_{W2}}$$

The first estimate function $\xi(\theta)$ obtained from the computer 3 for the first estimate function is applied to the computer 6 for the second estimate function.

In addition, the hand position or posture controller 4 obtains the deviation for the hand position or posture from the present value output from the present value detector 1 and the targeted value output from the targeted value detector 2, and calculates an interpolated number for the position and for the posture from the default velocity for position and posture. In the same manner, it obtains an angular deviation for the S3 axis from a present value and a targeted value and obtains an interpolated number for the S3 axis from the default velocity of the S3 axis. Then, it calculates the hand position or posture velocity r' which should be taught to each axis based on the maximum value among the three obtained interpolated numbers applied to the computer 6 for the second estimate function.

The computer 5 for the S3 axis calculates three interpolated numbers for the position, posture, and S3 axis, just as the computer 4 did for the hand position or posture, from the present value output of the present value detector 1 and the targeted value output of the targeted value detector 2. Then, it calculates the angular velocity $\theta_{S3}'$ based on the maximum value (among the obtained three interpolated numbers) to apply to the computer 6 for the second estimate function.

In addition, the computer 6 for the second estimate function calculates the second estimate function K from the first estimate function $\xi(\theta)$, the hand position or posture velocity r', and the angular velocity $\theta_{S3}'$. Note the Jacobian matrix J and the quasi-inverse Jacobian matrix J* are obtained in advance using each axial angle $\theta_{S1}'$ to $\theta_{W2}'$ detected by the present value detection means 1 of FIG. 1. The mathematical equation (1) is represented as the following matrix regarding an angular velocity for each axis $\theta_{S1}'$ to $\theta_{W2}'$:

Mathematical Equation 3

$$\begin{bmatrix} \theta'_{S1} \\ \theta'_{S2} \\ \theta'_{S3} \\ \vdots \\ \theta'_{W2} \end{bmatrix} = \begin{bmatrix} J^* \ r_{S1} \\ J^* \ r_{S2} \\ J^* \ r_{S3} \\ \vdots \\ J^* \ r_{W2} \end{bmatrix} + \begin{bmatrix} Q_{S1} \\ Q_{S2} \\ Q_{S3} \\ \vdots \\ Q_{W2} \end{bmatrix} \cdot K \quad (2)$$

Note that $J^* r_{S1}$ to $J^* r_{W2}$ are the least norm for each axis. In addition, $(I-J^* \cdot J) \cdot \xi(\theta)$ is a 1×7 matrix and a value for each axis is indicated as $Q_{S1}$ to $Q_{W2}$.

Using the axial angular velocity $\theta_3'$, the second estimate function K is obtained as follows:

$$K = (\theta'_3 - J^* r_{S3})/Q_{S3} \quad (3)$$

That is, the second estimate function K is calculated based on the axial angular velocity $\theta_3'$ and outputs an axial velocity for each axis to the computer 7.

The computer 7, for each axial velocity, calculates an angular velocity for each axis other than the S3 axis such as $\theta_{S1}'$, $\theta_{S2}'$, $\theta_{E1}'$, $\theta_{E2}'$, $\theta_{W1}'$, $\theta_{W2}'$ based on the second estimate function K output from the computer 6. Computer 7 outputs an angular velocity for all axes, together with each axial velocity for each axis $\theta_{S1}'$ to $\theta_{W2}'$ together with an axial velocity $\theta_3'$ of the S3 axis. These are the taught values for each axis of a redundancy manipulator in the sampling cycle. The "sampling cycle" is the time interval for providing the manipulator with the axial angle velocity values. For a seven-axis redundancy manipulator the value can be provided at 10 msec intervals. Thus, the sampling cycle would be 10 msec. This embodiment repeats the above steps until all data reaches the taught final targeted points.

This can be shown by the following matrix:

$$\begin{bmatrix} \theta_{S1} \\ \theta_{S2} \\ \theta_{S3} \\ \theta_{E1} \\ \theta_{E2} \\ \theta_{W1} \\ \theta_{W1} \end{bmatrix} = \begin{bmatrix} V_{q1} \\ V_{q2} \\ V_{q3} \\ V_{qE1} \\ V_{qE2} \\ V_{qW1} \\ V_{qW1} \end{bmatrix} + \begin{bmatrix} \xi_{S1} \\ \xi_{S2} \\ \xi_{S3} \\ \xi_{E1} \\ \xi_{E2} \\ \xi_{W1} \\ \xi_{W2} \end{bmatrix} \times$$

Taught velocities for each of the axial angles. Other values but $\theta_{S2}$ are unknown.

Known values obtained from the special solution representing the taught elbow or joint velocities Known values representing the 1st estimate function.

$K$
Known value (scalar value) representing the 2nd estimate function.

Thus in the computer 7, the the velocities for each of the axial angles on the left-hand side, which are the values to be sent to the arm as taught or command values, are calculated based on the known values shown on the right-hand side.

In this embodiment, unlike the conventional method where the estimate function $\xi(\theta) \cdot K$ is normally 1, $\xi(\theta) \cdot K$ changes for each sampling cycle. Also, when calculating the second estimate function K, the value of the key redundancy axis S3 is interpolated so that its motion finishes (its deviation becomes zero) at least before the time that the hand position or posture of a manipulator reaches its targeted axial value. Then, an axial angular velocity $\theta_{S3}'$ is calculated. The second estimate function K is calculated to actualize the axial angular velocity $\theta_{S3}'$ and each axial angular velocity $\theta'$ for all axes is determined according to the second estimate function K. In this way, by binding the S3 axis to ensure its movement to the targeted axial value, the axial values for axes other than the S3 axis are given an axial angular velocity to actualize the target. As a result, the hand position or posture of a manipulator reaches its target, and at the same time, the posture of a manipulator can meet its target.

Figure 4A:
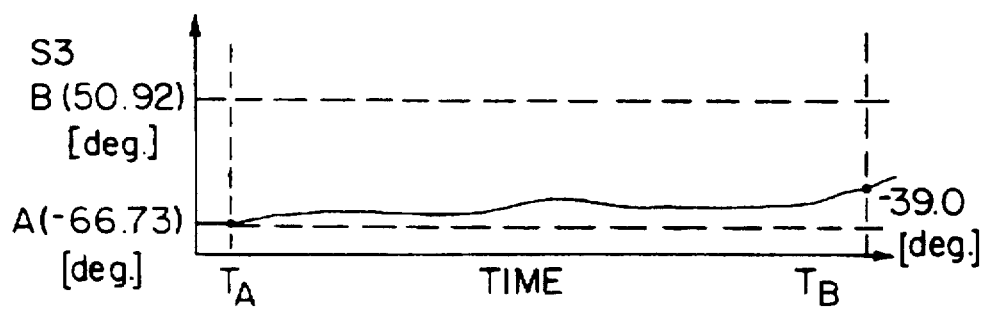
FIG. 4(A) is a graphical waveform showing the movement of a conventional manipulator with time.
Figure 4B:
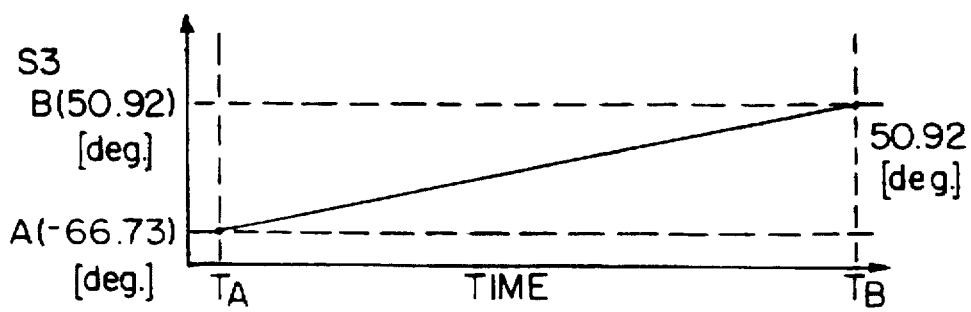
FIG. 4(B) is a graphical waveform showing the movement of a manipulator with time in accordance with the principles of the present invention.

FIGS. 4(A) and 4(B) illustrate the measurements to demonstrate the effects of controlling the motion of a redundancy manipulator of this embodiment. FIG. 4(A) plots the angles for the S3 axis against time during the playback of controlled motion in the conventional method. FIG. 4(B) is a graphical plot of the angles for the S3 axis against time during the playback of controlled motion of this embodiment. In FIGS. 4(A) and 4(B), the Y-axis shows the S3 axial angles; the X-axis shows time. Assume that two data points A and B are taught, and one moves from Point A to Point B by the playback controlling motion. The targeted angles for the S3 axis at taught data points A and B are described as follows:

A=−66.73 [deg.]

B=50.92 [deg.]

As illustrated in FIG. 4(A), in the conventional method, when the hand position or posture reaches point B, the axial angle of S3 has not yet reached the targeted angle of Point TB. That is, the axial angle of S3 does not reach its targeted angle simultaneously with the hand position or posture. Rather it gradually reaches the targeted angle later. On the other hand, the apparatus incorporating the principles of the present invention, as shown in FIG. 4(B), at Point TB where the hand position or posture reaches Point B, the S3 axis simultaneously reaches its targeted angle. According to our experiment, when the S3 axis, which is the key redundant axis (elbow), conforms with its targeted angle, the other six axes generally conform with their respective targeted angles. It is apparent that conforming the S3 axis with its targeted angle controls the elbow posture of a manipulator as taught by the data.

Conventionally, when one tries to take advantage of a redundancy manipulator to avoid an obstacle or a specific point, it takes an extremely long time to calculate the optimal estimate function $\xi(\theta) \cdot K$ through a complex and difficult calculation method, making it difficult to control on a real-time basis. On the other hand, in this embodiment, obtaining the optimal estimate function $\xi(\theta) \cdot K$ is relatively easy. Therefore, the optimal solution can be obtained within a control cycle and the redundancy manipulator can be operated in real time. That is, the taught motion can be repeated and yet can be controlled on a real-time basis. For these reasons, the following procedures may be carried out more easily than usual in an appropriate manner: (1) Tombstone polishing: Polish a hard stone into a complex shape; (2) Paint work: High-speed painting, avoiding an obstacle; (3) Welding: Slow welding with precision avoiding an obstacle.

While the present invention has been described with respect to an illustrated embodiment, it should be recognized that various modifications may be made by persons skilled in the art after receiving the teaching of the present disclosure without departing from the scope of the invention.

What is claimed is:

1. Apparatus for controlling the movement of an end effector of a redundant manipulator from a present position to a target position, said manipulator having at least seven axes of motion including a key redundancy axis, said apparatus comprising:

a first detector for detecting the values for the present positions of said end effector and of each of said axes of said manipulator and providing first output signals corresponding to said respective present positions;

a second detector for detecting the values for said target positions for said end effector and for each of said axes of said manipulator and providing second output signals corresponding to said target positions;

a first computer responsive to said first and second output signals for providing a third output signal in the form of a seven-dimensional vector corresponding to the target positions for each of said seven axes;

an end effector controller responsive to said first and second output signals for providing a fourth output signal corresponding to end effector velocity for each axis as said end effector is moved to its target position;

a key redundancy axis controller responsive to said first and second output signals and for providing a fifth output signal corresponding to the angular velocity of said key redundancy axis as said end effector is moved to its target position;

a second computer responsive to said third, fourth, and fifth output signals for providing a sixth output signal corresponding to the axial velocity of each of said axes as said end effector is moved to its target position; and a third computer responsive to said sixth output signal for calculating an angular velocity for each axis other than said key redundancy axis and providing a seventh output signal corresponding to the angular velocity for each of said axes other than said key redundancy axis and to the axial velocity of said key redundancy axis for moving said end effector to said target position, whereby said end effector and each of said axes reaches its respective target position substantially simultaneously.

2. Apparatus, as claimed in claim 1, wherein said manipulator is a shoulder, arm, and hand manipulator, said key redundancy axis corresponds to the elbow, and said end effector corresponds to the hand.

3. Apparatus, as claimed in claim 1, wherein a respective motor is provided for rotating each of said axes, said first computer is a first estimate value, $\xi(\theta)$, computer and said seven-dimensional vector has seven (7) elements showing seven (7) ratios for the rotational direction of each of said motors.

4. Apparatus, as claimed in claim 3, wherein said second computer is a second estimate function, K, computer and obtains said second estimate function from the following formula:

$$K=(\theta'_3 - J^* \ast r_{S3})/Q_{S3}$$

where

K=second estimate function;

$\theta'_3$=axial angular velocity of the key redundancy axis;

$J^*$=the quasi-inverse Jacobian matrix;

$J^* r_{S3}$=the least norm for the key redundancy axis;

$Q_{S3}$=a value for the key redundancy axis determined from the 1×7 matrix $(1-J^* \cdot J) \cdot \xi(\theta)$.

5. A method of controlling the movement of an end effector of a redundancy manipulator from a present position to a target position, said manipulator having an elbow posture and at least seven axes of motion, comprising the steps of:

calculating the optimal estimate function for the elbow target posture from among an infinite number of possible elbow postures of said manipulator to permit said elbow posture to reach said elbow target posture at least before said end effector reaches said target position; and controlling said elbow posture of said redundancy manipulator based on said optimal estimate function.

6. A method, as claimed in claim 5, wherein said end effector corresponds to a hand position or posture of said manipulator.

7. A method of controlling the movement of an end effector of a redundancy manipulator from a present position to a target position, said redundancy manipulator having at least seven axes including a key redundant axis determined by the links configured for said manipulator, comprising the steps of:

calculating an axial angle velocity for said key redundant axis to reach a target position before said end effector reaches its target position in every sampling cycle;

interpolating said key redundancy axial angle velocity so that it reaches its targeted position in every sampling cycle; and computing said axial angle velocity for axes other than said key redundant axis in every sampling cycle based on said axial angle velocity of said key redundant axis.

8. A method of controlling the movement of an end effector of a redundancy manipulator from a present position to a target position, said redundancy manipulator having at least seven axes including a key redundant axis, comprising the steps of:

detecting the present value and the targeted value in every sampling cycle, said present value and said targeted value comprising the end effector velocity and the velocity of each axis for moving from the present position to the end position;

calculating a estimate function based on the axial velocity of said end effector and said key redundant axis obtained by interpolating the key redundant axial value so that said end effector reaches its targeted position in every sampling cycle; and calculating the axial angle velocities for axes other than said key redundant axis based on said estimate function in every sampling cycle.

9. A method, as claimed in claim 8, including the step of motion controlling for a redundancy manipulator in calculating said axial angle velocity based on the axial angle deviation of said key redundant axis.

10. A method, as claimed in claim 8, wherein said redundancy manipulator calculates said end effector velocity, and axial angle velocities for each of said axes, and a estimate function based on the following formula:

$$\theta'=J^{*}\cdot r'+(I-J^{*}\cdot J)\cdot P$$

where $\theta'$=axial angle velocity for each axis r'=hand position or posture velocity I=unit matrix J=Jacobian matrix J*=quasi-inverse Jacobian matrix P=estimate function.

11. A method, as claimed in claim 8, wherein said estimate function is represented by the following formula:

$$P=(\theta'_K-\theta'_{KO})/(I-J^{*}\cdot J)$$

where

P=estimate function $\theta'_K$=axial angle velocity for the key redundant axis $\theta'_{KO}$=least norm for the key redundant axis I=unit matrix J=Jacobian matrix J*=quasi-inverse Jacobian matrix.

* * * * *